(12) United States Patent
Hyman, Jr.

(10) Patent No.: US 9,609,849 B1
(45) Date of Patent: Apr. 4, 2017

(54) PET WASTE CATCHER

(71) Applicant: Kenneth Hyman, Jr., Williamston, NC (US)

(72) Inventor: Kenneth Hyman, Jr., Williamston, NC (US)

( * ) Notice: Subject to any disclaimer, the term of this patent is extended or adjusted under 35 U.S.C. 154(b) by 0 days.

(21) Appl. No.: 14/568,799

(22) Filed: Dec. 12, 2014

Related U.S. Application Data (60) Provisional application No. 61/929,729, filed on Jan. 21, 2014.

(51) Int. Cl.
*A01K 29/00* (2006.01)
*A01K 23/00* (2006.01)
*E01H 1/12* (2006.01)

(52) U.S. Cl.
CPC .... *A01K 23/005* (2013.01); *E01H 2001/1293* (2013.01)

(58) Field of Classification Search
CPC .......... A01K 23/005; E01H 2001/1293; E01H 1/1206; E01H 2001/128; E01H 2001/1286
USPC ............................. 294/1.5, 1.3, 1.4, 209, 210
See application file for complete search history.

(56) References Cited

U.S. PATENT DOCUMENTS

| | | | |
|---|---|---|---|
| 3,786,780 A | 1/1974 | Pezzino | |
| 4,012,067 A | 3/1977 | Travis | |
| 4,262,948 A * | 4/1981 | Emme | A01K 23/005 294/1.5 |
| 4,852,924 A | 8/1989 | Ines | |
| 4,896,912 A * | 1/1990 | Parnell | E01H 1/1206 15/257.1 |
| 5,131,704 A * | 7/1992 | Li | A01K 23/005 294/1.4 |
| 5,269,575 A * | 12/1993 | Parvaresh | A01K 23/005 294/1.5 |
| 5,360,247 A * | 11/1994 | Vachter | E01H 1/12 294/1.4 |
| 5,779,290 A * | 7/1998 | Wilke | A01K 23/005 294/1.5 |
| 5,899,510 A * | 5/1999 | Hayes | E01H 1/1206 294/1.4 |
| 5,971,452 A | 10/1999 | Marymor et al. | |
| 6,039,370 A | 3/2000 | Dooley, Jr. et al. | |
| 6,149,214 A * | 11/2000 | Kipka | A01K 23/005 294/1.5 |
| 6,257,473 B1 | 7/2001 | Ringelstetter | |
| 6,314,917 B1 | 11/2001 | Ryan | |
| 6,485,073 B2 | 11/2002 | Harrison | |
| 6,554,335 B1 | 4/2003 | Kelly et al. | |

(Continued)

FOREIGN PATENT DOCUMENTS

ES  DE 102012103071 A1 *  7/2013  ........... E01H 1/1206

*Primary Examiner* — Gabriela Puig
(74) *Attorney, Agent, or Firm* — Robert C. Montgomery; Montgomery Patent & Design, LP.

(57) ABSTRACT

A pet waste catcher device has a series of handle segments forming an extendable handle. Each segment is of a larger diameter than the one (1) previous to enable the shaft to extend and retract in length. A first end of the shaft is provided with a circular ring member to retain disposable bags. A second end of the shaft is provided with a handle, having a covered compartment. A user manipulates the handle to position the circular ring with a disposable bag underneath an animal to collect waste. The covered compartment serves as a case to hold various items selectively chosen by a user.

13 Claims, 7 Drawing Sheets

(56) References Cited

U.S. PATENT DOCUMENTS

| | | | |
|---|---|---|---|
| 6,702,349 | B2 | 3/2004 | Clements |
| 6,942,264 | B1* | 9/2005 | Mendez ............... A01K 23/005 294/1.5 |
| 7,073,462 | B1 | 7/2006 | Layman |
| 7,090,268 | B2 | 8/2006 | Borman |
| 7,431,360 | B1* | 10/2008 | Bielak ................. A01K 23/005 294/1.5 |
| D645,216 | S | 9/2011 | Silas |
| 8,256,384 | B2 | 9/2012 | Wheeler et al. |
| 8,342,138 | B2 | 1/2013 | Hazan |
| 8,397,915 | B2 | 3/2013 | Davidson |
| 2004/0090073 | A1* | 5/2004 | Edwards ................ A47L 13/52 294/1.3 |
| 2004/0189026 | A1* | 9/2004 | Denham ............... E01H 1/1206 294/1.3 |
| 2004/0189028 | A1* | 9/2004 | Newman ............... F16B 7/149 294/210 |
| 2006/0001281 | A1 | 1/2006 | Hubert |
| 2006/0125255 | A1* | 6/2006 | Bell ..................... E01H 1/1206 294/1.3 |
| 2006/0231043 | A1* | 10/2006 | Galdo .................. A01K 27/006 119/796 |
| 2006/0232083 | A1* | 10/2006 | Kamenkovich ...... A01K 23/005 294/1.5 |
| 2008/0042456 | A1* | 2/2008 | Patel .................... E01H 1/1206 294/1.3 |
| 2008/0116704 | A1* | 5/2008 | Botello ................ A01K 23/005 294/1.5 |
| 2008/0179902 | A1* | 7/2008 | Phillips ................ E01H 1/1206 294/1.3 |
| 2009/0095225 | A1* | 4/2009 | O'Connell ........... A01K 27/006 119/161 |
| 2010/0237640 | A1* | 9/2010 | Chia .................... E01H 1/1206 294/1.3 |
| 2011/0284544 | A1* | 11/2011 | Davies ................. B65F 1/062 220/315 |
| 2012/0080894 | A1 | 4/2012 | Williamson |
| 2012/0235431 | A1 | 9/2012 | Beaton |
| 2013/0082470 | A1* | 4/2013 | Seiko .................. A01K 23/005 294/1.5 |
| 2013/0125834 | A1* | 5/2013 | Gee ..................... A01K 27/003 119/795 |

\* cited by examiner

PET WASTE CATCHER

RELATED APPLICATIONS

The present invention was first described in and claims the benefit of U.S. Provisional Application No. 61/929,729, filed Jan. 21, 2014, the entire disclosures of which are incorporated herein by reference.

FIELD OF THE INVENTION

The present invention relates generally to a pet waste catcher device with a ring member to retain disposable bags located at the end of a shaft, wherein the ring is manipulated by a user.

BACKGROUND OF THE INVENTION

The act of walking a dog or other pet is a pleasure enjoyed by many pet owners. The ability to get outside and experience nature and the surroundings is a simple joy. There are also the great health benefits associated with exercise for both the dog and the human walker. However, one (1) additional task associated with walking of a dog is the cleaning up of droppings. This act is not only the responsible thing to do, but it is the sanitary thing to do as well. To accomplish this task, one must carry a bag and a small shovel with them as the dog or pet is being walked or come back later without the pet to retrieve the droppings. In either case it is a messy, smelly situation that no one enjoys. It also requires bending over to perform the task, which many such as the elderly or disabled are incapable of doing. Accordingly, there is a need for a means by which one can quickly and effectively retrieve dog or pet droppings without the mess, fuss and the requirement to bend over.

SUMMARY OF THE INVENTION

The disadvantages of the prior art are overcome by the present invention in providing a pet waste catcher device having an extendable handle comprising a first handle segment, a second handle segment disposed within and extendable from the first handle segment, and a third handle segment disposed within and extendable from the second handle segment. The catcher has a ring assembly disposed at an end of the extendable handle that retains and holds open a disposable bag. A case for the user is also disposed on the handle of the catcher. The use of the present invention provides dog owners an effective means to clean up pet droppings during a walk in a manner which not only does not require them to bend over, but is quick, easy and effective as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 pet waste catcher
20 extendable handle assembly
22 first handle segment
23 first collet ring
24 first ring internal thread
25 first ring internal taper
26 knurling
27 second collet ring
28 second ring internal threading
29 second ring internal taper
30 second handle segment
32 second segment kerf
34 second segment external taper
36 second segment external threading
40 third handle segment
42 third segment kerf
44 third segment external taper
46 third segment external threading
50 ring assembly
52 first ring
53 first inner ring wall
54 first ring apron
56 first ring taper
62 second ring
64 second ring taper
66 bag lip
68 elbow
70 case assembly
71 case support
72 upper shell
73 top
74 upper shell side
75 upper shell corner
76 lower shell
77 bottom
78 lower shell side
79 lower shell corner
80 hinge assembly
81 hinge pin
82 hinge leaf
83 hinge spring 84 spring arm
85 spring arm retainer
86 hinge knuckle
87 hinge fastener
89 interior
90 latch
91 latch retainer
92 latch spring
93 latch hook
94 latch release button
95 latch button plate
96 latch release aperture
97 latch spring retainer
99 indicia
100 bag

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a pet waste catcher (herein referred to as the "apparatus") 10, which provides a sanitary disposal means for collecting the excrement of a pet in a disposable bag 100 retained in a ring assembly 50 located at a distal end of an extendable handle assembly 20. A hinged case assembly 70 is provided at a proximal end of the extendable handle 20 for the temporary storage of items selectively chosen by a user. It should be noted that the size of the pets to which this apparatus 10 can be used may vary considerably, it is intended that the preferred embodiment of the apparatus 10 be produced in a range of sizes without limiting the scope of the invention.

Figure 1:
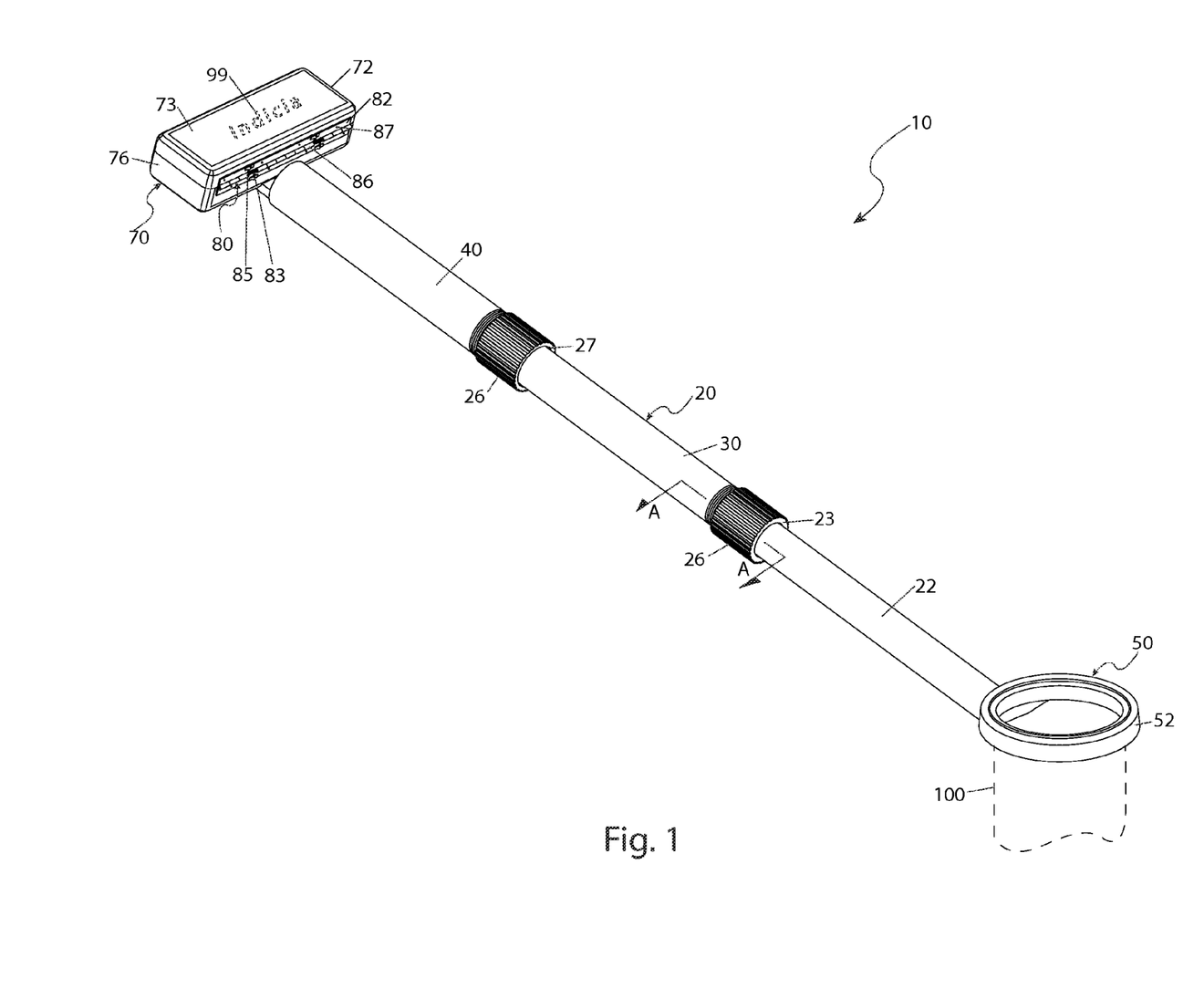
FIG. 1 is an isometric view of a pet waste catcher 10 in accordance with the preferred embodiment of the present invention.
Figure 8:
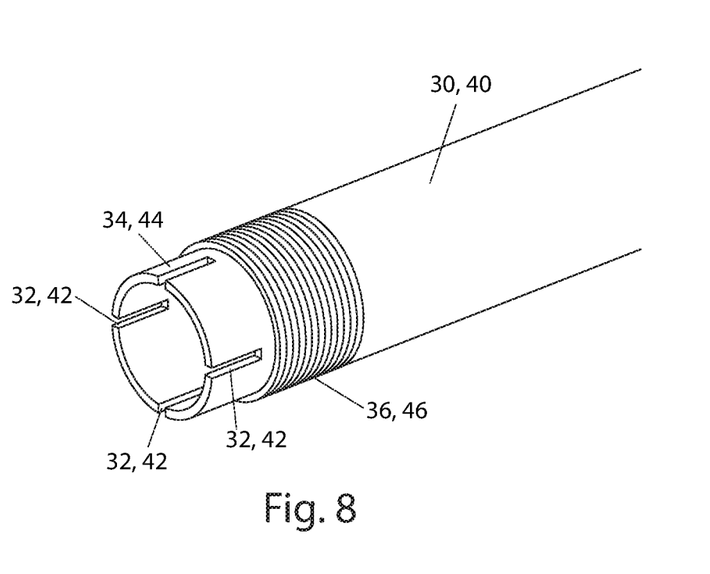

Referring now to FIG. 1, an isometric view of the apparatus 10 according to the preferred embodiment of the present invention, is disclosed. The apparatus includes an extendable handle assembly 20, a ring assembly 50, and a hinged storage case assembly 70. The extendable handle assembly 20 is configured with a first handle segment 22, a second handle segment 30, and a third handle segment 40. The handle segments 22, 30, and 40 are preferably fabricated from PVC pipe of a size and schedule to achieve a sliding fit with each other. The first segment 22 fitting within the second 30, and the second 30 fitting within the third 40. As shown in FIG. 8, disposed on the distal end of the second handle segment 30 is a second segment external taper 34 and a second segment external threading 36. The second segment external taper 34 is the result of the removal of a decreasing amount of the tube wall of approximately one inch (1 in.) of the distal end of the second handle segment 30. The distal end of the second handle segment 30 preferably has four (4) second segment kerf 32 slots in the second segment external taper 34 which are accomplished with two (2) perpendicular saw cuts across the diameter of the second handle segment 30.

Figure 7:
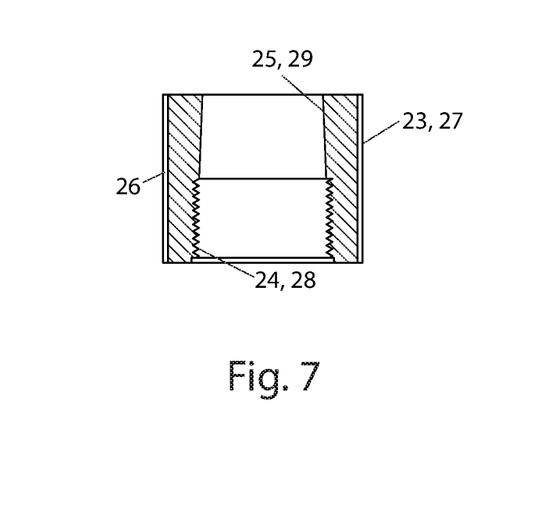
FIG. 7 is a cross-section along line A-A as seen in FIG. 1 of a first collet ring 23 of the pet waste catcher 10 in accordance to the preferred embodiment of the present invention; and, FIG. 8 is a perspective view of the distal end of a second handle segment 30, or of a third handle segment 40, of the pet waste catcher 10 in accordance with the preferred embodiment of the present invention.

The second segment external threading 36 receives and retains a first collet ring 23. The first collet ring 23 is an annular ring, preferably constructed of a thermoplastic material, formed with a first ring internal taper 25 and a first ring internal threading 24 as seen in FIG. 7. The first ring internal taper 25 would preferably be the complementary form of the second segment external taper 34 disposed upon the second handle segment 30, while the first ring internal threading 24 would be a mating thread to the second segment external threading 36. It is understood that other materials may be used in the fabrication of the first collet ring 23 without limiting the scope of the apparatus 10.

According to the preferred embodiment, the first collet ring 23 is installed on the second handle segment 30 by engaging the first ring internal threads 24 with the second segment external threading 36. Then, the proximate end of the first handle segment 22 is inserted into the distal end of the second handle segment 30, through the first collet ring 23 to a desired depth. The further engagement of the mating threads, preferably beyond three (3) turns results in the first ring internal taper 25 coming in contact with the second segment external taper 34 on the second handle segment 30. The further threading of the first collet ring 23 results in the deformation of the distal end of the second handle segment 30 at the taper 34 and causes a consequential narrowing of the second segment kerfs 32 to engage the outer wall of the first handle segment 22 and limiting the telescoping action between the first handle segment 22 and the second handle segment 30.

Similarly, disposed on the distal end of the third handle segment 40 is a third segment external taper 44 and a third segment external threading 46. The third segment external taper 44 is the result of the removal of a decreasing amount of the tube wall of approximately one inch (1 in.) of the distal end of the third handle segment 40. The distal end of the third handle segment 40 preferably has four (4) third segment kerf 42 slots in the third segment external taper 44 which are accomplished with two (2) perpendicular saw cuts across the diameter of the third handle segment 40.

The third segment external threading 46 receives and retains a second collet ring 27. The second collet ring 27 is an annular ring, preferably constructed of a thermoplastic material, formed with a second ring internal taper 29 and a second ring internal threading 28 as seen in FIG. 7. The second ring internal taper 29 would preferably be the complementary form of the third segment external taper 44 disposed upon the third handle segment 40, while the second ring internal threading 28 would be a mating thread to the third segment external threading 46. It is understood that other materials may be used in the fabrication of the second collet ring 27 without limiting the scope of the apparatus 10.

According to the preferred embodiment, the second collet ring 27 is installed on the third handle segment 40 by engaging the second ring internal threading 28 with the third segment external threading 46. Then, the proximate end of the second handle segment 30 is inserted into the distal end of the third handle segment 40, through the second collet ring 27 to a desired depth. The further engagement of the mating threads preferably beyond three (3) turns would result in the second ring internal taper 29 coming in contact with the third segment external taper 44 on the third handle segment 40. The further threading of the second collet ring 27 results in the deformation of the distal end of the third handle segment 40 and causes a consequential narrowing of the third segment kerfs 42 to engage the wall of the second handle segment 30 and limiting the telescoping action between the second handle segment 30 and the third handle segment 40.

Figure 2:
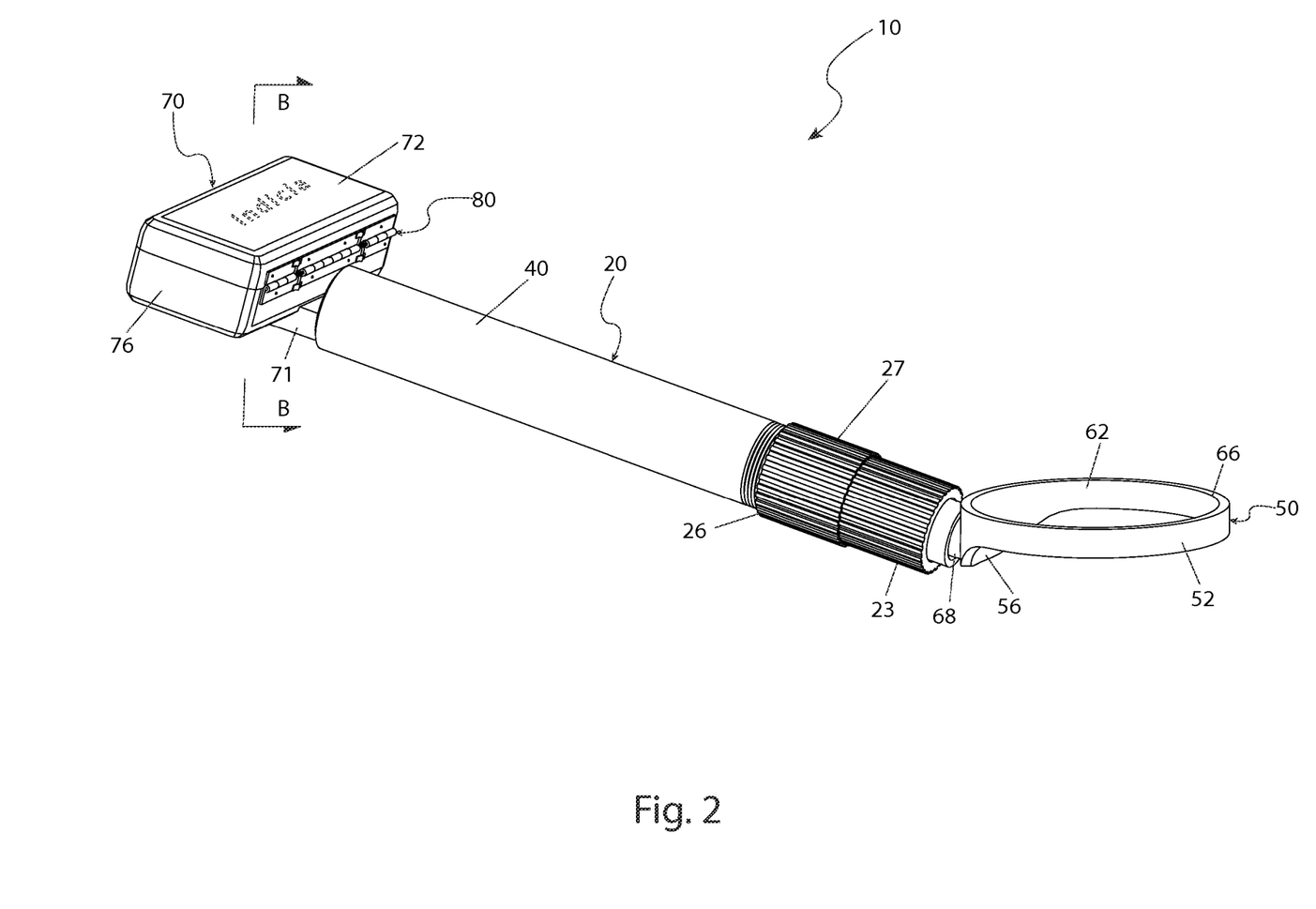
FIG. 2 is an isometric view of the pet waste catcher 10 depicted in a collapsed configuration in accordance with the preferred embodiment of the present invention.

Referring now to FIG. 2, an isometric view of the apparatus 10, depicted in a collapsed or stowed configuration, according to the preferred embodiment of the present invention is disclosed. The first collet ring 23 can be loosened to allow the first handle segment 22 to telescope into the mating second handle segment 30. The first collet ring 23 can then be tightened, in the aforementioned manner, to retain the first handle segment 22 relative to the second handle segment 30. In a similar fashion the second collet ring 27 can be loosened to allow the second handle segment 30 to telescope into the mating third handle segment 40. The second collet ring 27 can then be tightened to secure the second handle segment 30 relative to the third handle segment 40. The first collet ring 23 and the second collet ring 27 are preferably configured to have a knurling 26 around the exterior surface to improve a user's grip for turning.

Figure 3:
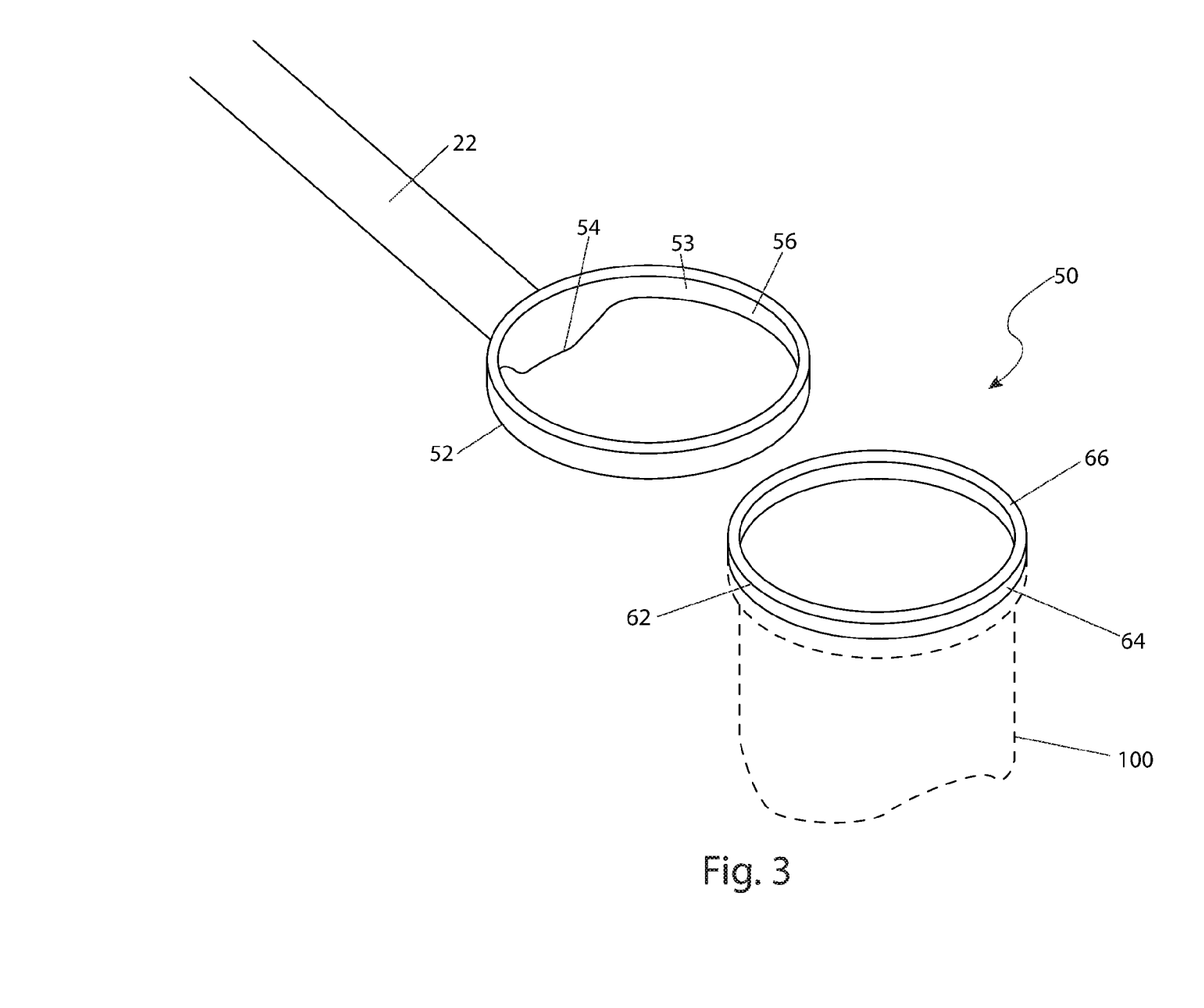
FIG. 3 is a detail view of a holder ring assembly 50 of the pet waste catcher 10 in accordance with the preferred embodiment of the present invention.

Referring now to FIG. 3, a detail view of the ring assembly 50 of the apparatus 10, according to the preferred embodiment of the present invention, is disclosed. The ring assembly 50 includes a first ring 52 and a second ring 62 which are each preferably composed of a thermoplastic material and formed in an injection molding process. Other materials and other methods of fabrication may be utilized without limiting the scope of the apparatus 10. The first ring 52 is configured to have a portion of the first inner ring wall 53 extended to incorporate a first ring apron 54 for the purpose of attaching an elbow 68. The elbow 68 is configured as two (2) thermoplastic cylinders of unequal length with the longitudinal axes of the cylinders disposed at approximately one hundred sixty five degrees) (165° to each other. The first ring 52 may be formed as one (1) piece with the elbow 68 or may alternately be attached to the shorter cylinder of the elbow 68 with an adhesive. The diameter of the longer cylinder of the elbow 68 is preferably slightly larger than the inside diameter of the first handle segment 22 such that a press fit is required for assembly. The inside diameter of the first ring 52 is preferably configured to be uniformly decreasing from the lower edge to the upper edge so as to form a first ring taper 56.

The second ring 62 fits within the first ring 52 by a taper fit wherein the outside diameter of the second ring 62 is preferably configured to be uniformly decreasing from the lower edge to the upper edge to form a second ring taper 64 that matches the profile of the first ring taper 56. The second ring 62 also includes a bag lip 66 disposed about its upper edge to obviate any sharp corners which may damage a collection bag 100. In this manner a top of a disposable plastic bag 100 is brought up through the second ring 62 and folded back over the bag lip 66, then the second ring 62 and bag 100 are inserted into the bottom of the first ring 52, the matching first ring taper 56 and the second ring taper 64 cooperate to clamp the bag 100 between the two rings 52 and 62.

Figure 4:
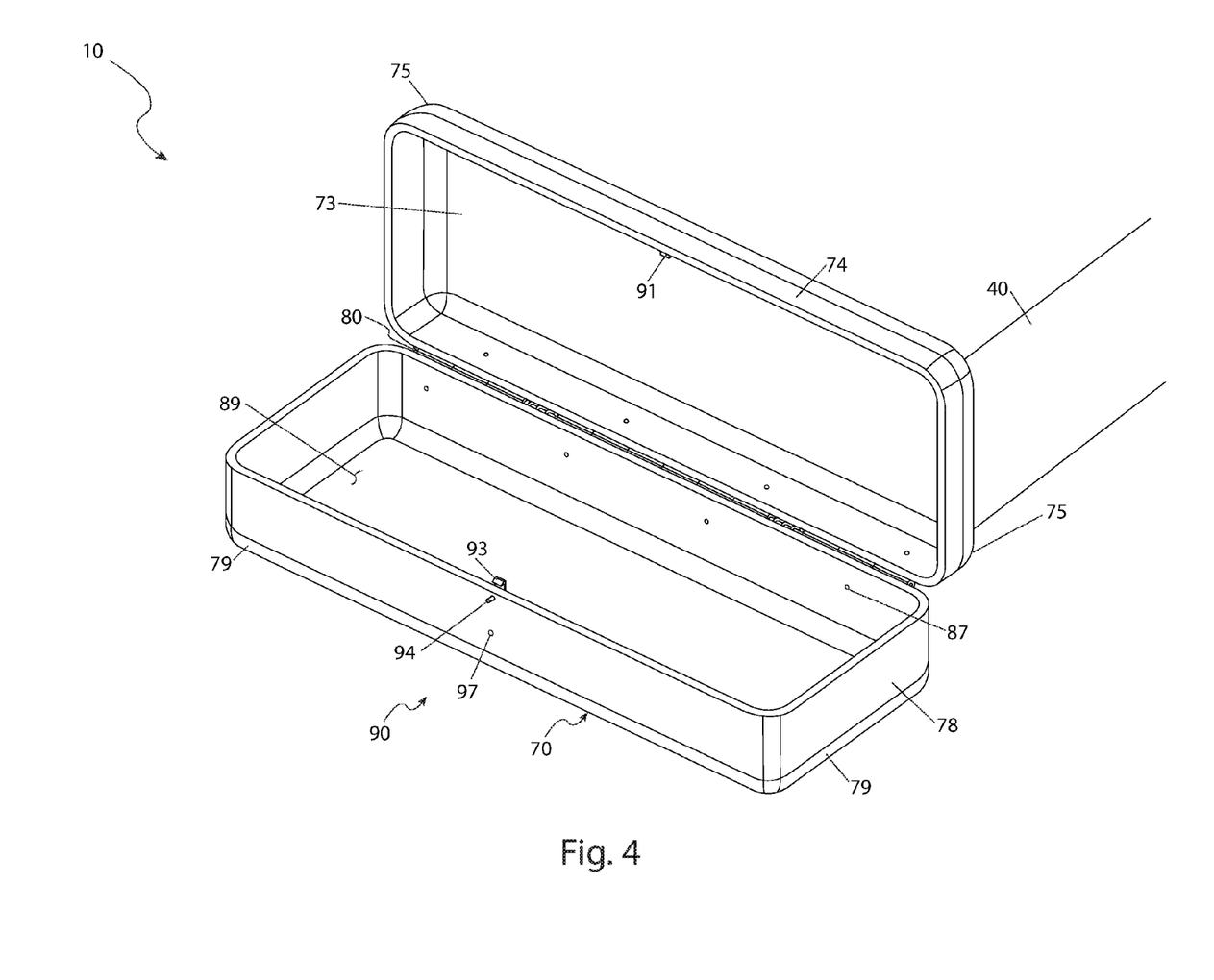
FIG. 4 is a detail view of a case assembly 70 mounted to a third handle segment 32 of the pet waste catcher 10 in accordance with the preferred embodiment of the present invention.
Figure 5:
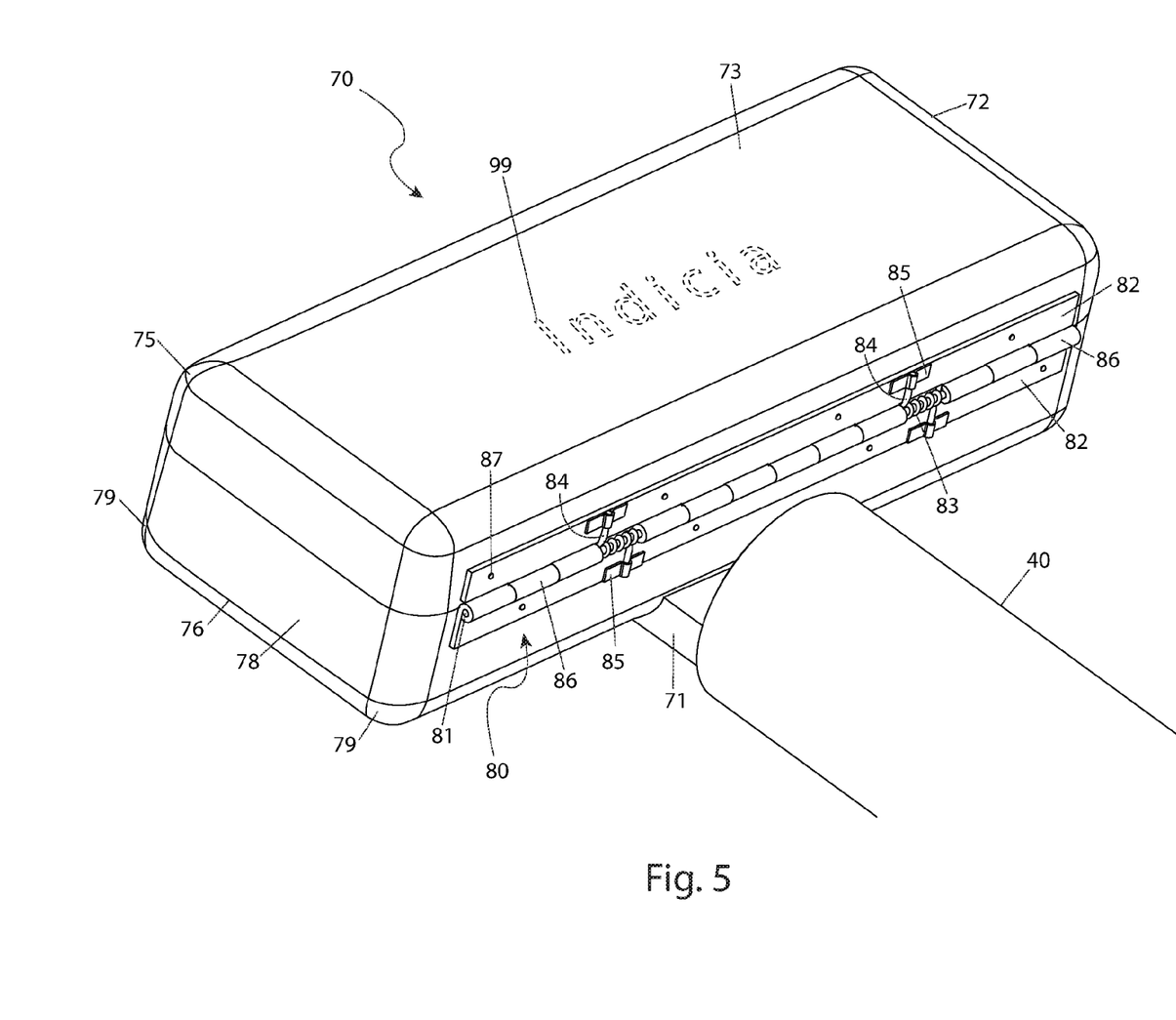
FIG. 5 is a detail view of a hinge spring 83 incorporated into the case assembly 70 of a pet waste catcher 10 in accordance with the preferred embodiment of the present invention.
Figure 6:
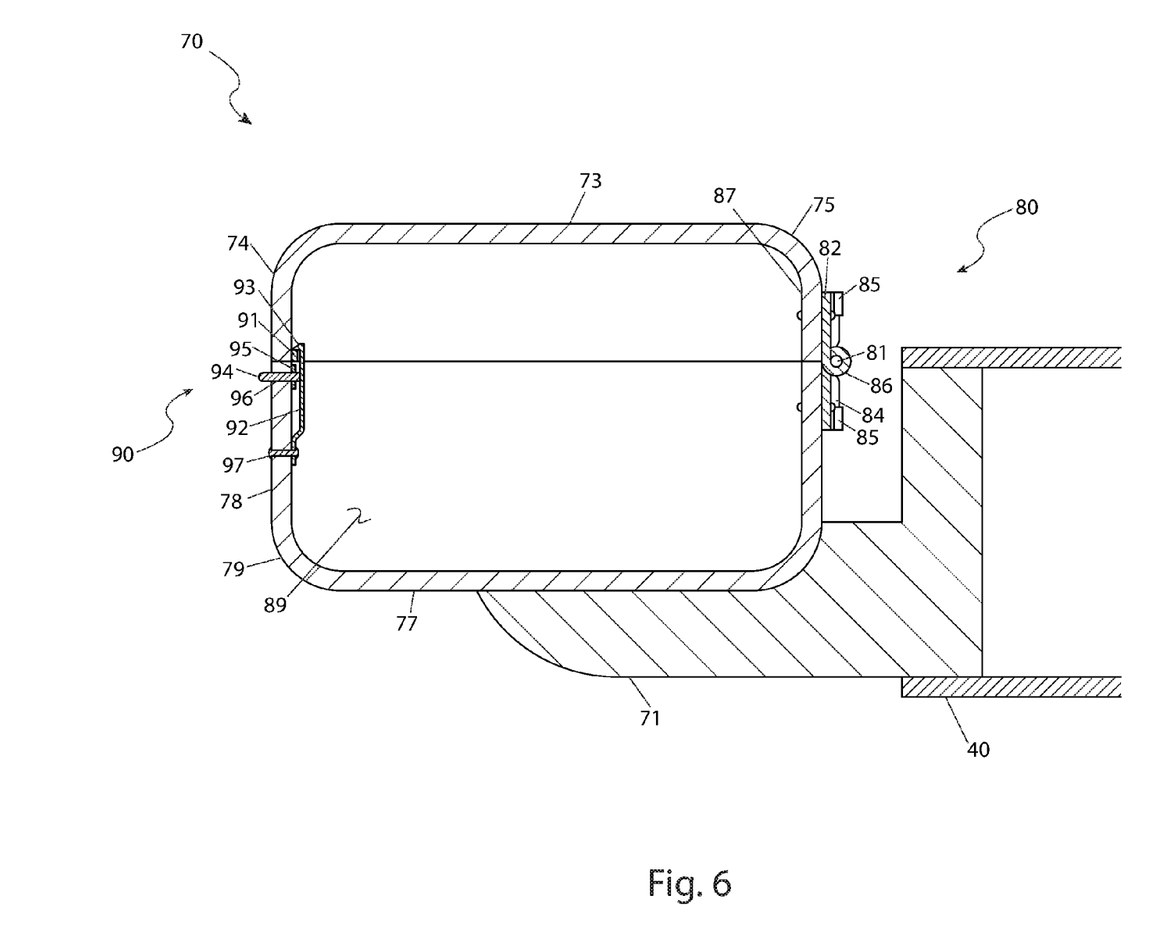
FIG. 6 is a section view along line B-B as shown in FIG. 2 of the case assembly 70 of the pet waste catcher 10 in accordance with the preferred embodiment of the present invention.

Referring now to FIGS. 4 and 5, detail views of the case assembly 70, and FIG. 6, a section view along line B-B as seen in FIG. 2, of the apparatus 10, according to the preferred embodiment of the present invention, are disclosed. The case assembly 70 is configured with an upper shell 72 and a lower shell 76 which are preferably constructed of a rigid thermoplastic as two (2) individual parts in an injection molding process, and as such may be presented in a wide variety of colors and surface finish textures. However, it is understood that other materials may be utilized without limiting the scope of the apparatus 10. The lower shell 76 is configured as a planar bottom 77 with a wrap-around lower shell side 78 joined along all abutting edges to incorporate four (4) preferable rounded lower shell corners 79 and formed in one (1) piece to incorporate a case support 71. In some embodiments the bottom 77 may have contours other than a strictly planar configuration without limiting the scope of the apparatus 10. The case support 71 is generally cylindrical in shape melding into the lower shell 76 so as to support the lower shell 76 along a portion of the bottom 77 and a segment of the lower shell side 78. The outside diameter of case support 71 is preferably slightly larger than the inside diameter of the third handle segment 40 such that a press fit is required for assembly of the case support 71 into the proximal end of the third handle segment 40. The upper shell 72 is comprised of a preferably planar top 73 with a contiguous wrap-around upper shell side 74 incorporating upper shell corners 75 formed in one (1) piece.

Additionally, it is envisioned that some surface portions of the case assembly 70 may bear various indicia 99 which may provide script or logos based upon a user's preference and may include images such as, but not limited to, business names/logos, personal names, symbols, lines, pictures, and the like, in various colors and patterns, to further customize and personalize the apparatus 10.

The upper shell 72 and the lower shell 76 are attached to opposite hinge leaves 82 of a hinge assembly 80 by means of a plurality of hinge fasteners 87, and form an interior 89 of sufficient volume for the storage of items selected by the user. The hinge assembly 80 would preferably incorporate at least one (1) hinge spring 83 wrapped around the hinge pin 81 so as to bias the case assembly 70 in an open configuration. The hinge spring 83 would preferably be accommodated by the omission of a hinge knuckle 86 from an otherwise normally alternating pattern of hinge knuckles 86 on each hinge leaf 82. Each hinge spring 83 would be provided with opposing spring arms 84. The spring arms 84 are cylindrical extensions of the ends of a coiled torsion spring through which the spring force an act. The spring arms 84 are conjoined to each opposing hinge leaf 82 by means of a spring arm retainer 85. Other embodiments of the hinge assembly 80 may require that the spring arm retainers 85 be configured in a different style; however, this should not be interpreted as a limitation factor of the apparatus 10.

A latch 90 is disposed along a side of the case assembly 70 opposite from the hinge assembly 80. The latch 90 is configured to hold the case assembly 70 closed against the forces of the hinge springs 83 and to retain any items placed within the interior 89. A latch retainer 91 generally configured as a cube, projects from an interior edge of the upper shell side 74 so as to engage with a latch hook 93 to hold the case assembly 70 in a closed position. The latch retainer 91 may be molded into the upper shell 72 at the time of fabrication, or may be attached at a subsequent time with the use of adhesives or by an alternate method. The latch hook 93 is configured as a one-way interference device and is disposed at a first end of a latch spring 92. The latch spring 92 is attached at a second end to the interior of the lower shell side 78 in alignment with the latch retainer 91 by means of a latch spring retainer 97. The latch spring retainer 97 is preferably a rivet but may be any structure, or combination of structures, configured to retain the latch spring 92. The latch spring 92 is preferably a piece of spring steel, or other such material capable of withstanding a great number of flexure cycles, provided with a coating or plating material to resist corrosion. A latch release button 94 is inserted through a latch release aperture 96 in the lower shell side 78 and placed against the latch spring 92. The latch release button 94 is preferably a cylinder composed of a durable, rigid thermoplastic material. A latch button plate 95 is attached to the latch release button 94 on the interior 89 side of the lower shell 76 in order to retain the latch release button 94 between the latch spring 92 and the lower shell side 78. The latch button plate 95 is preferably a square piece of a rigid thermoplastic material fitted onto the latch release button 94 and secured with an adhesive.

The preferred embodiment of the present invention can be utilized in a simple and straightforward manner with little or no training. After initial purchase or acquisition of the apparatus 10, it would be configured as indicated in FIG. 2. The method of utilizing the apparatus 10 for the purpose of collecting pet excrement may be achieved by performing the following steps: acquiring a model of the apparatus 10 having a desired size and style to suit the needs of the user; removing the second ring 62 from the apparatus 10; placing a disposable plastic bag 100 inside of the second ring 62 with the open end oriented toward the bag lip 66; folding the open end of the bag 100 over the bag lip 66 to cover the second ring taper 64 completely; inserting the second ring 62, with the folded bag 100, into the first ring 52 until the second ring taper 64 becomes engaged in the first ring taper 56 and secures the bag 100; loosening the first collet ring 23; extending the first handle segment 22 with the attached ring assembly 50 and bag 100 from the second handle segment 30 approximately twelve inches (12 in.); tightening the first collet ring 23 to secure the relative positions of the first handle segment 22 and the second handle segment 30; loosening the second collet ring 27; extending the interlocked first handle segment 22 and the second handle segment 30 from the third handle segment 40 approximately twelve inches (12 in.); tightening the second collet ring 27 to secure the relative positions of the second handle segment 30 and the third handle segment 40; placing the ring assembly 50 with the open bag 100 under the pet to catch the pet's excrement; removing the second ring 62 from inside of the first ring 52 after the pet has completed the bowel movement; properly securing and disposing of the bag 100; reinstalling the second ring 62 back into the first ring 52; loosening the second collet ring 27; completely collapsing the interlocked first handle segment 22 and the second handle segment 30 into the third handle segment 40; tightening the second collet ring 27; loosening the first collet ring 23; completely collapsing the first handle segment 22 with the attached ring assembly 50 into the second handle segment 30 and tightening the first collet ring 23.

The case assembly 70 may be accessed for the storage of user selected items or for the removal of previously stored items by performing the following steps: depressing the latch release button 94 to cause the upper shell 72 to pivot about the hinge pin 81 thereby exposing the interior 89 of the case assembly 70; removing or inserting the desired item(s); closing the case assembly 70 by pivoting the upper shell 72 about the hinge pin 81 and permitting the latch hook 93 to engage the latch retainer 91 to secure the upper shell 72 in a closed position.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A pet waste catcher comprising:
   a handle assembly having an elongated first handle segment with an elbow at its distal end, an elongated second handle segment slideably receiving said first handle segment, an elongated third handle segment slideably receiving said second handle segment, a first collet ring for selectively locking said first handle segment to said second handle segment, and a second collet ring for selectively locking said second handle segment to said third handle segment;
   a ring assembly having a first ring with a tapered inner diameter and an apron attached to said elbow, said ring assembly further including a removable second ring with a tapered outer diameter wherein said tapered outer diameter cooperatively fits within said first ring;
   a case affixed to a proximate end of said handle assembly; and,
   a disposable bag retained in and held open by said ring assembly.

2. The catcher of claim 1, wherein said first handle segment and said second handle segment are disposed within said third handle segment when stowed.

3. The catcher of claim 1, wherein said first collet ring is threaded on said second handle segment and said second collet ring is threaded on said third handle segment.

4. The catcher of claim 1, wherein said case further comprises:
   a lower shell;
   an upper shell operatively attached to said lower shell; and,
   a case support disposed on said lower shell and affixed to said proximate end of said handle.

5. The catcher of claim 4, wherein said case further comprises a hinge assembly operatively disposed between said lower shell and said upper shell.

6. The catcher of claim 5, wherein said hinge assembly further comprises a spring loaded hinge operatively disposed between said lower shell and said upper shell.

7. A pet waste catcher comprising:
   an extendable handle comprising:
   a first handle segment having an elbow at its distal end;
   a second handle segment operatively attached to said first handle segment using a tapered and threaded second handle segment distal end; and,
   a third handle segment operatively attached to said second handle segment using a tapered and threaded third handle segment distal end;
   a ring assembly having a first ring with a tapered inner diameter and an apron attached to said elbow, said ring assembly further including a removable second ring with a tapered outer diameter wherein said tapered outer diameter cooperatively fits within said first ring;
   a case affixed to said extendable handle; and,
   a disposable bag retained in and held open by said ring assembly.

8. The catcher of claim 7, wherein said handle further comprises:
   a first collet ring threadingly disposed on said second handle segment distal end; and,
   a second collet ring threadingly disposed on said third handle segment distal end;
   wherein said first collet is adapted to selectively secure said first handle segment to said second handle segment; and, wherein said second collet is adapted to selectively secure said second handle segment to said third handle segment.

9. The catcher of claim 7, wherein said first handle segment and said second handle segment are disposed within said third handle segment when stowed.

10. The catcher of claim 7, wherein said case further comprises:
- a lower shell;
- an upper shell operatively attached to said lower shell; and,
- a case support disposed on said lower shell and affixed to said proximate end of said handle.

11. The catcher of claim 10, wherein said case further comprises a hinge assembly operatively disposed between said lower shell and said upper shell.

12. The catcher of claim 11, wherein said hinge assembly further comprises a spring loaded hinge operatively disposed between said lower shell and said upper shell.

13. A pet waste catcher comprising:
- a handle assembly comprising:
- a first handle segment having an elbow at its distal end;
- a second handle segment operatively attached to said first handle segment; and,
- a third handle segment operatively attached to said second handle segment;
- a ring assembly having a first ring with a tapered inner diameter and an apron attached to said elbow, said ring assembly further including a removable second ring with a tapered outer diameter wherein said tapered outer diameter cooperatively fits within said first ring;
- a case having a hinged lid and attached to said handle assembly; and,
- a disposable bag retained in and held open by said ring assembly.

* * * * *